(12) United States Patent
Taddeo

(10) Patent No.: US 8,823,338 B2
(45) Date of Patent: Sep. 2, 2014

(54) UNIVERSAL SINGLE-STAGE POWER CONVERTER

(75) Inventor: Stephen R. Taddeo, Long Beach, CA (US)

(73) Assignee: Green Charge Networks LLC, Huntington Beach, CA (US)

( * ) Notice: Subject to any disclaimer, the term of this patent is extended or adjusted under 35 U.S.C. 154(b) by 377 days.

(21) Appl. No.: 13/362,195

(22) Filed: Jan. 31, 2012

(65) Prior Publication Data
US 2013/0194846 A1 Aug. 1, 2013

(51) Int. Cl.
*G05F 3/16* (2006.01)

(52) U.S. Cl.
USPC ............................................ 323/225

(58) Field of Classification Search
USPC ................. 363/17, 34, 37, 123; 323/222–226
See application file for complete search history.

(56) References Cited

U.S. PATENT DOCUMENTS

| | | | |
|---|---|---|---|
| 4,272,806 A | 6/1981 | Metzger | |
| 4,663,579 A | 5/1987 | Yang | |
| 5,473,528 A | 12/1995 | Hirata | |
| 5,598,326 A | 1/1997 | Liu | |
| 5,602,481 A | 2/1997 | Fukuyama | |
| 5,734,205 A | 3/1998 | Okamura | |
| 5,760,570 A | 6/1998 | Nagai | |
| 6,069,804 A * | 5/2000 | Ingman et al. | 363/21.14 |
| 6,281,662 B1 | 8/2001 | Flohr | |
| 6,556,459 B2 | 4/2003 | Okui et al. | |
| 6,774,606 B1 | 8/2004 | Hall | |
| 6,828,766 B2 | 12/2004 | Corva et al. | |
| 7,046,532 B2 | 5/2006 | Matsuo et al. | |
| 7,064,521 B2 | 6/2006 | Stanesti | |
| 7,394,225 B2 | 7/2008 | Guang | |
| 7,414,381 B2 | 8/2008 | Popescu-Stanesti | |
| 7,432,694 B2 | 10/2008 | Brenden et al. | |
| 7,746,041 B2 * | 6/2010 | Xu et al. | 323/223 |
| 7,782,032 B2 | 8/2010 | Taufik et al. | |
| 2002/0125854 A1 | 9/2002 | Williamson | |
| 2005/0275373 A1 | 12/2005 | Guang | |
| 2009/0067208 A1 * | 3/2009 | Martin et al. | 363/126 |

\* cited by examiner

*Primary Examiner* — Adolf Berhane
*Assistant Examiner* — Yemane Mehari
(74) *Attorney, Agent, or Firm* — Richard C. Galati; Holland & Hart LLP

(57) ABSTRACT

A universal electrical power converter having the combined capabilities of symmetrical and asymmetrical converters, bidirectionality, and simplicity is provided with methods for controlling it in single-stage conversion. In some cases, the converter charges an inductor connected in parallel between a regulated port and an unregulated port using energy stored by a capacitor positioned in parallel between the inductor and one of the ports until the inductor has a level of current stored that corresponds to the change in voltage desired at the regulated port, then discharges stored energy into the other port until a current cutoff threshold level is reached in the inductor. In some embodiments a single stage power converter is provided having three or more ports that can be connected and disconnected from the same inductor. Converters disclosed herein can convert AC signals when there is cross switching on at least one side or branch of the converter.

22 Claims, 15 Drawing Sheets

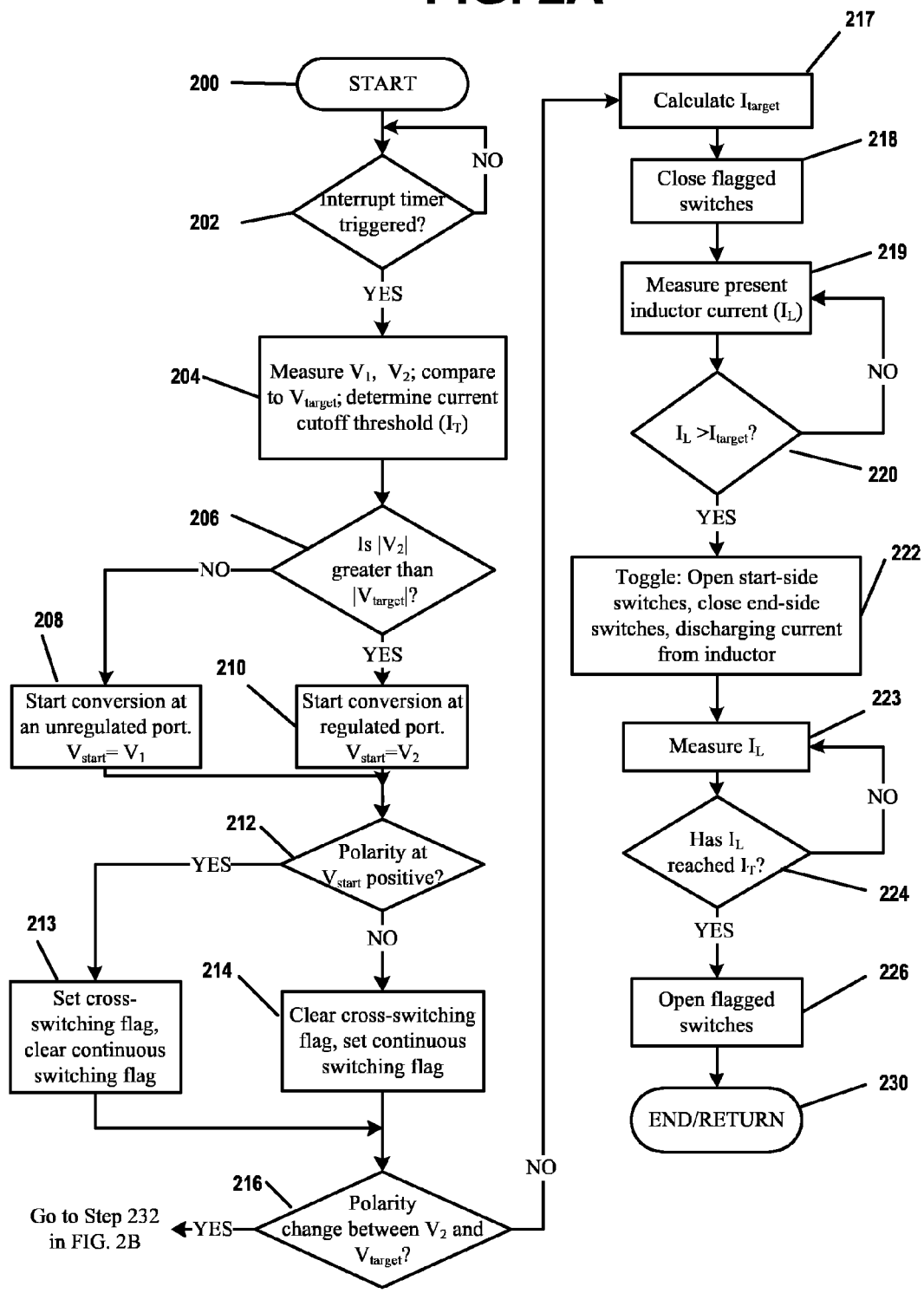

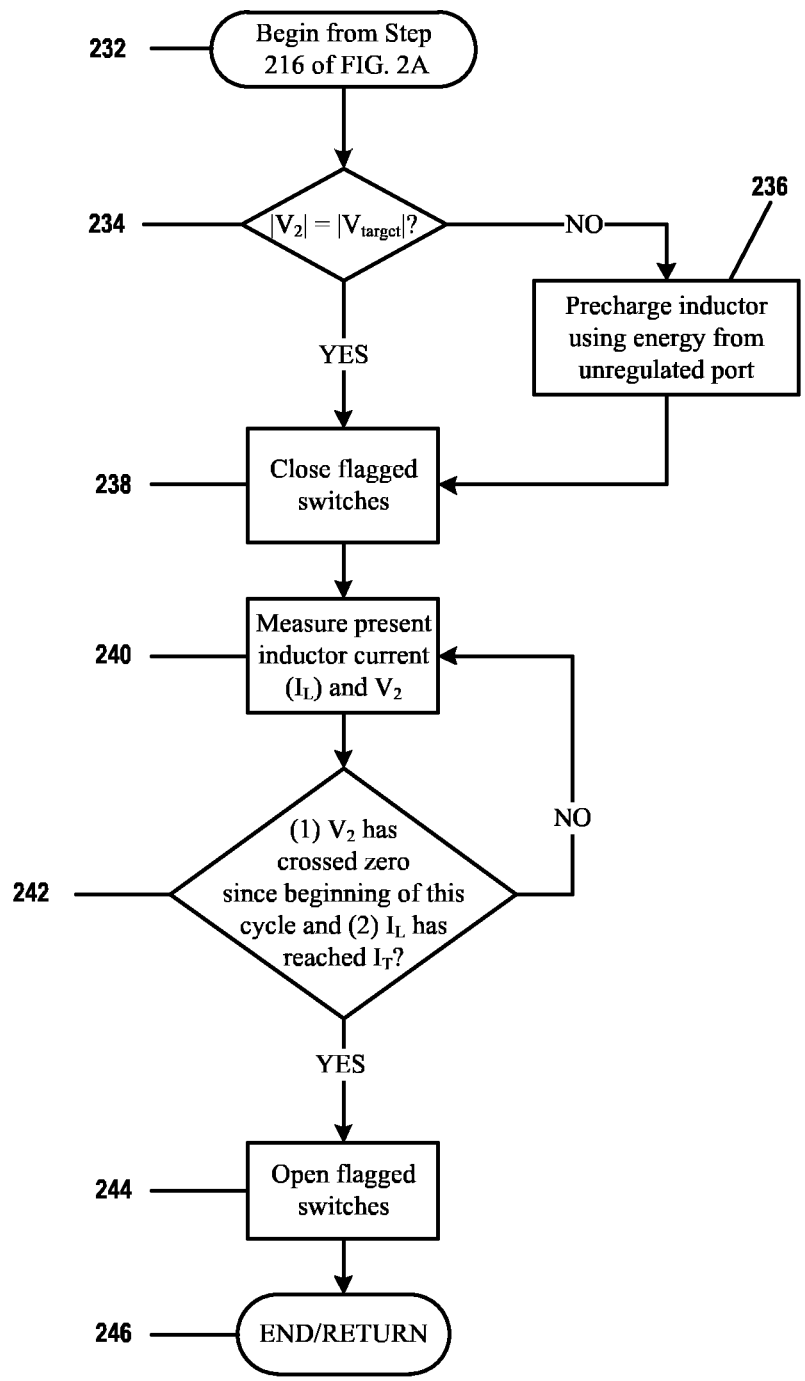

UNIVERSAL SINGLE-STAGE POWER CONVERTER

CROSS-REFERENCE TO RELATED APPLICATIONS

Not applicable.

BACKGROUND

The present invention is directed to the fields of power conversion, signal processing, and related fields.

Many electronic AC to AC power converters and inverters employ a two-stage conversion process which converts an AC input power form to an intermediate DC voltage (the bus voltage) which is afterward converted into the desired AC output form. These converters may be called "multi-stage" because the input AC power form is converted in multiple stages—e.g., from AC to DC and then from DC back to AC—as opposed to a "single stage" converter that produces the output signal after a single conversion. Typical single stage converters are not as versatile as their multi-stage counterparts because the single stage topologies must usually sacrifice bidirectionality or symmetry of conversion for their single stage conversion simplicity.

AC to AC single stage converters illustrate these limitations. Due to the alternating polarity of AC signals, the polarity of the input voltage presented to these converters may be unpredictable, so converter designs need sophisticated means to adapt and compensate. For example, some converters may incorporate a diode-based rectifier circuit to ensure that the input voltage has an expected polarity or voltage. Such a rectifier significantly increases the expense and inefficiency of the system, particularly when the desired output voltage may not need to have the ability to reverse its polarity. Additionally, the rectifier makes it difficult, if not impossible, to achieve bidirectionality using the same circuit elements because of the presence of the diodes, so it is overly complicated to add additional inputs or outputs to the converter without introducing even more inefficiency and expense. Without the rectifier, alternative converters are typically multi-stage or not fully universal.

BRIEF SUMMARY

Symmetrical and asymmetrical power converters and inverters have attempted to address the flaws previously mentioned with various degrees of success, but a universal converter having the combined capabilities of symmetrical and asymmetrical converters, bidirectionality, simplicity, and versatility is still desired. It is therefore an object of the present invention to present a circuit, topology, and method that addresses these issues more effectively and comprehensively than other existing solutions.

Various embodiments of the invention may allow symmetric conversion, asymmetric conversion, and bidirectional conversion using a simple, single-stage topology. In at least one exemplary embodiment, a converter is provided that has first and second conversion points or ports, one of which is regulated such that the voltage measured at the regulated point follows an AC or DC pattern, and the other of which is unregulated. An inductive means (e.g., simple inductor) is positioned in parallel between these two ports, and a capacitive means is positioned in parallel between each port and the inductor (e.g., a first capacitor and second capacitor).

Multiple switches (e.g., MOSFETs) are positioned between the first capacitor and the inductor and between the second capacitor and the inductor in such a manner that when they are closed, some switches reverse the relative polarity of the signal coming from a port and other switches merely propagate the signal between the inductor and the connected port without affecting polarity. With this switch configuration, each port in the converter may be disconnected from the inductor or the other port. For example, the inductor may be charged using energy from the unregulated port while the regulated port is isolated from the inductor, and then the energy that was transferred to the inductor may be discharged to the regulated port when the unregulated port is disconnected. The regulated port may then be disconnected from the inductor when the energy transfer is complete or when the voltage across the regulated port has reached a desired value. In some embodiments the converter calculates a current cutoff threshold during the conversion process, and the inductor is disconnected from the ports when the inductor discharges enough to reach or cross the current cutoff threshold. This can be advantageous because if the current cutoff threshold is set to zero, minimal energy is needed during the conversion process if the inductor is charged just enough to bring about the desired voltage at the regulated port when the inductor is subsequently discharged until it reaches or crosses the threshold.

The voltage of each port is prevented from dropping significantly between charge and discharge events by the capacitors placed in parallel to the ports on each side of the inductor. Using properly rated switches, capacitors, and inductors, a charge and discharge algorithm for controlling the switches may allow bidirectional AC-AC, AC-DC, DC-AC, and DC-DC conversion using simple circuitry without having a preferential input or output voltage magnitude or polarity and without the losses and expense of diodes, multiple conversion stages, and other extraneous elements.

In some embodiments multiple additional ports may be configured in the circuit that can each transfer energy to and from the inductive means. Additional branches have switches placed between the inductive means and a branch capacitor that is in parallel with the branch port. In these embodiments the multiple branches may draw energy from the same inductive element while providing potential for optimizing the electronics of each port or other benefits.

In some other embodiments, redundant switching means in one or more branches may be eliminated to reduce complexity and cost.

Additional and alternative features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features.

FIG. 2A is a flowchart showing an exemplary single stage conversion cycle using an embodiment of the converter of FIG. 1.

FIG. 2B is a flowchart showing part of an exemplary single stage conversion cycle used in some embodiments of the invention wherein the voltage of the regulated port of the converter undergoes a polarity change to reach the target value.

DETAILED DESCRIPTION

General Information

Figure 1:
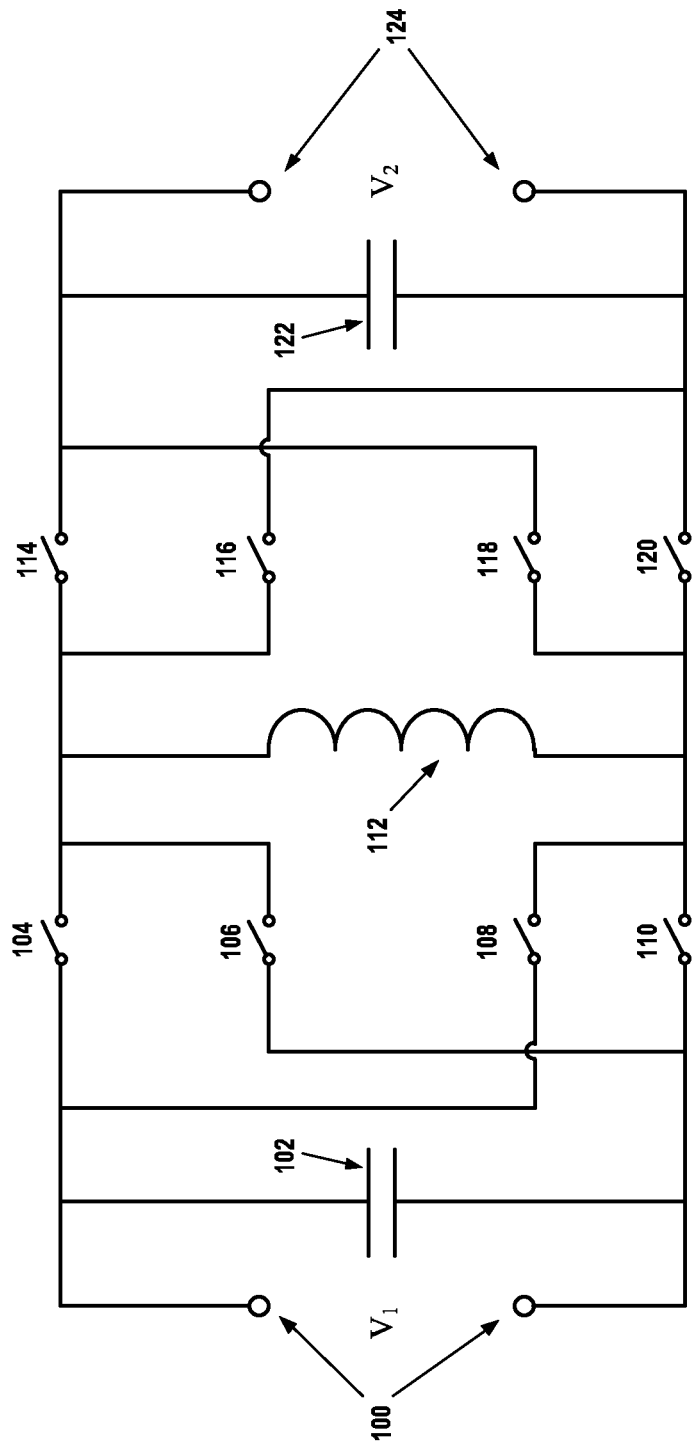
FIG. 1 is a diagram of an exemplary universal single stage power converter circuit.

Generally speaking, as used herein a "power converter" may refer to a generic electric power converter, inverter, transformer, regulator, voltage stabilizer, rectifier, power supply unit, or other conversion device or combination of these devices that may be used to convert the current, voltage, frequency, or phase of an electrical power source or signal from one form into another form. A "universal" power converter is a converter capable of bidirectional AC-AC, AC-DC, DC-DC, and DC-AC conversion without replacing, adding, removing, or exchanging component parts of the converter such as capacitors and inductors. For the purposes of this document a universal converter may however have parts that have their status or mode of operation adjusted, such as by opening or closing switching elements (e.g., MOSTFETs, transistors or other electrical switches) that are part of the converter.

A "bidirectional" power converter has at least one port that may be configured to serve as either an input or an output to the other port or ports. In a bidirectional converter with two ports, both ports must be capable of acting as an input and an output, but in a converter with more than two ports, only one of the ports must have that capability to be considered bidirectional, and the other ports may or may not be able to do so. In contrast, a unidirectional converter converts one signal to another, but cannot reverse the conversion process using the same circuitry as the initial conversion.

A "symmetrical" power converter converts one waveform type into the same waveform type (e.g., AC to AC or DC to DC). An "asymmetrical" power converter converts a waveform type into another type (e.g., AC to DC or DC to AC).

The basic topology of a "single stage" power converter includes an "input" or "unregulated" port energy storage medium (e.g., capacitor), an "output" or "regulated" port energy storage medium (e.g., capacitor), and a shuttling medium (e.g., inductor) or "shovel" to transfer energy in variable quantities between the ports' storage media. Thus an accurate update of a regulated port's voltage (or current) can be brought about after charging and discharging one shuffling medium during a single conversion cycle. A non-single-stage converter differs in that it stores energy in an intermediate storage medium (e.g., capacitor) through a first shuffling medium and then transfers that stored energy to an energy storage medium at the regulated port via another shuffling medium over a single conversion cycle. In such a converter, each exchange of energy though a shuttling medium can be considered one stage of the conversion. For the purposes of this document, a voltage or current transformer may be considered to be a single energy storage medium (even though there may be multiple coils in the transformer) as long as energy in the transformer is stored in a single magnetic field.

Exemplary Dual-Port Converters

The preferred embodiments described herein may serve to improve the simplicity, value, manufacturing methods, and operation of power converters and inverters. The elimination of diodes from power converter operation also creates opportunities for more efficient operation and bidirectionality for the user through synchronous rectification. The ease of setting up and using a converter is also enhanced in some embodiments where a generic input signal can be converted without preference to an input or output magnitude or polarity.

Referring now to the figures in detail, FIG. 1 is a diagram of an exemplary single stage power converter circuit which is capable of bidirectional and symmetrical power conversion. A first port 100 is connected in parallel with a first capacitor 102 and a set of switches (104, 106, 108, and 110) to an inductor 112. A second port 124 is also connected in parallel to the inductor 112, a second set of switches (114, 116, 118, and 120), and a second capacitor 122. The voltages across the first port 100 and the second port 124, and thus the first capacitor 102 and the second capacitor 122, may be referred to as $V_1$ and $V_2$, respectively. The inductor 112 shown in FIG. 1 is a simple inductor, but in other embodiments, the inductor 112 may be an isolation transformer having multiple windings or another type of inductor. The sets of switches can be said to be "linking" the capacitors to the inductor when current can flow between a capacitor and the inductor through the switches when the switches are closed.

This converter is bidirectional, so the first port 100 and second port 124 of this converter circuit may interchangeably act as input or output (i.e., unregulated or regulated) ports depending on the algorithm used for controlling the switches. In order to facilitate the explanation of the process of FIGS. 2A and 2B, the second port 124 of the embodiment of FIG. 1 is the port having its voltage regulated by the converter to reach a target voltage and the first port 100 is an unregulated port.

Some embodiments also comprise a controller capable of reading and executing instructions and capable of setting the state of the switching elements of the converter. In some embodiments the controller may also measure the electrical properties of the parts of the converter or external signals. For example, a controller may be comprised of a computer, a processor module and memory module enabled to read computer-readable media or computer-useable instructions, a software-executing device, an integrated circuit or circuit having firmware with instructions and steps preprogrammed into it, and other devices or entities capable of reading and executing the instructions, processes, and methods discussed herein. It should be understood that it is possible to embody the control of this invention using only combinatorial logic. A controller may also be accompanied by a control circuit for sending and receiving information and commands between parts of the converter or other devices and the controller. For example, the controller may send "close" commands to switching elements that cause the switching elements to close, or, if they are already closed, to remain closed. FIG. 1 does not illustrate a controller or control circuit, but if the depicted embodiment had a controller shown, it would be capable of at least controlling the open or closed state of the switches 104 through 110 and 114 through 120, measure the voltage of the capacitors 102 and 122 and the ports 100 and 124, and measure the current in the inductor 112.

FIG. 2A is a flowchart showing an exemplary method of operating an embodiment of the converter of FIG. 1. The method initializes at point 200. Next, the controller waits until an interrupt timer is triggered at step 202. Once the timer has triggered, $V_1$ and $V_2$ are measured and compared to the target output voltage ($V_{target}$), and a current cutoff threshold ($I_T$) for the inductor is determined at step 204. In this step, $V_1$ and $V_2$ are simply measured at their respective capacitors (102 and 122) or ports (100 and 124), and $V_{target}$ is determined by referencing a predetermined function of a signal that the converter is being called upon to produce. In practice, all three of these values may be sampled or measured simultaneously at the start of each conversion. The current cutoff threshold ($I_T$) is a value of the inductor's current that, when reached, indicates that the inductor should be disconnected from the ports of the converter (as discussed in further detail below). In typical embodiments the current cutoff threshold is zero so that the inductor is disconnected from the ports of the converter (i.e., all switches allowing current to flow through the inductor are opened) when the current in the inductor reaches or crosses zero. A zero current cutoff threshold may confer the advantage of operating the converter in continuous mode for reduced output voltage ripple or for higher power operation.

Next, the controller determines the "starting side" of the converter in steps 206, 208, and 210. For the purposes of this embodiment, the unregulated side of the converter includes the first port 100, first capacitor 102, and nearby switches 104, 106, 108, and 110, and the regulated side of the converter includes the second port 124, second capacitor 122, and the other switches 114, 116, 118, and 120 from FIG. 1. The starting side of the converter is determined by comparing the magnitude of $V_2$ (the voltage of the side of the converter that is having its voltage regulated to $V_{target}$) to the magnitude of $V_{target}$ at step 206 in order to determine which side of the converter will be connected to the inductor first in the conversion process. If the magnitude of the voltage of the regulated port ($V_2$) is not greater than the magnitude of the target voltage ($V_{target}$), the starting side of the converter is set as the side having the unregulated port, which in this embodiment is the port with voltage $V_1$, at step 208. Therefore the voltage of the starting side ($V_{start}$) is $V_1$. If the magnitude of $V_2$ is greater than the magnitude of $V_{target}$, the side of the regulated port is set as the starting side, and $V_{start}$ is equal $V_2$, as shown in step 210.

Next, in step 212, the controller determines whether the polarity of $V_{start}$ is positive or negative. If positive, a cross-switching flag is set in step 213, and if not positive, the cross-switching flag is cleared in step 214. If the cross-switching flag is set, then the cross switches on the starting side of the converter are flagged to be closed later on in the process. Otherwise, the continuous switches on the starting side of the converter are flagged to be closed later in the process.

In these steps, "cross switching" refers to the switches that cause the current between a port (e.g., 100 or 124) and the inductor to be reversed when they are connected. In the embodiment of FIG. 1, this refers to switches 106 and 108 for the first port 100 and switches 116 and 118 for the second port 124. The corresponding continuous switches are the switches near the cross switches that do not reverse the flow of current between the port and the inductor. In FIG. 1, the continuous switches are switches 104 and 110 for the first port 100 and switches 114 and 120 for the second port 124. So, for example, if conversion were set to start at the second port's side in step 210 (i.e. $V_{start}=V_2$), and the polarity of $V_{start}$ is not positive in step 212, step 214 would flag switches 106, 108, 114, and 120, and the other flags would be cleared.

By convention in this document, positive current flow in the inductor is current flowing in the downward direction in the figures, and positive voltage on a port is a voltage where the upper terminal is more positive than the lower terminal of the port in the figures. For example, if the positive direction of current flow through the inductor 112 is defined as the downward direction through the inductor 112 in FIG. 1 and that the upper terminal of the first and second ports 100 and 124 are positive terminals (i.e., they have positive charge) and the lower terminals are negative terminals (i.e., they have negative charge), then the continuous switches are those switches that, when they are closed, induce a positive rate of change of current through the inductor. When a cross-switching set is closed, they induce a negative rate of change of current through the inductor.

In order for the conversion process to successfully change the regulated port's voltage to the target value, energy must be transferred to or taken from the regulated port's capacitor. The inductor is charged by the regulated port's capacitor when the energy stored in the regulated port's capacitor must decrease in order for the voltage on that port to match the target voltage. In this case, the starting side of the converter would have the regulated port. If the energy of the regulated port's capacitor must increase for the voltage on that port to match the target voltage, energy is transferred to it from the unregulated port via the inductor. In this case, the starting side of the converter has the unregulated port, and the ending side has the regulated port. Whether the regulated port is on the starting side or not, the inductor is charged by the starting side capacitor until it stores enough energy such that, by the end of the cycle (e.g., after the energy is discharged into the ending side capacitor if the ending side capacitor is the regulated port capacitor), the regulated voltage matches the target voltage. In embodiments where the starting side has the regulated port, the regulated voltage matches the target voltage at the time that the inductor is fully charged. Steps 217 through 226 of FIG. 2A illustrate one way this may be done. The amount of charge that the inductor is given is designed to precisely accomplish this desired change in voltage with the execution of each cycle.

At step 216, a polarity change between the regulated voltage and the target voltage is detected. If there is a change in polarity, then the controller proceeds at step 232 of FIG. 2B. If not, the controller proceeds to step 217.

In step 217, the controller calculates the target current value, $I_{target}$, that the inductor will need to be charged to by the starting side capacitor before the inductor is discharged to the ending side capacitor. First, the controller determines the difference in energy ($\Delta U_c$) between the regulated capacitor's present energy level (i.e., $U_{c,2}$, which is based on $V_2$) and the energy level of the regulated capacitor at the target voltage (i.e., $U_{c,target}$, which is based on $V_{target}$). The controller then uses $\Delta U_c$ to determine $I_{target}$ such that the energy of the inductor, when it is discharged into the ending side of the converter, will bring about $\Delta U_c$ and the regulated port will have voltage equal to $V_{target}$.

Because $U_{c,2}$ and $U_{c,target}$ can be determined by:

$$U_{c,2} = \frac{1}{2}(C_2)(V_2)^2, \text{ and}$$

$$U_{c,target} = \frac{1}{2}(C_2)(V_{target})^2,$$

(wherein $C_2$ is the capacitance of the regulated port's capacitor) then $$\Delta U_c = U_{c,target} - U_{c,2}.$$

And because $$U_{L,target} = \frac{1}{2}(I_{target})^2 L,$$

(wherein L is the inductance of the inductor) and the inductor will be discharged into the ending-side capacitor, $$\Delta U_c = \frac{1}{2}(I_{target})^2 L = U_{c,target} - U_{c,2}, \text{ so, by solving for } I_{target},$$

$$I_{target} \approx \sqrt{C_2\left(\frac{1}{L}\right)((V_{target})^2 - (V_2)^2)}.$$

The direction of $I_{target}$ through the inductor is provided by the switch settings for the converter, as determined in steps 214 or 216. The value of $I_{target}$ is shown as approximate because it may need to be adjusted slightly to account for losses or other errors inherent to the electronics.

Once $I_{target}$ is determined, the controller continues to step 218, wherein the starting side's switches (as determined by steps 206, 208 and 210) are closed and energy is transferred to the inductor 112 by the starting side of the circuit. The system monitors the instantaneous inductor current (step 219) and continues transferring energy to the inductor until the inductor's current level reaches or exceeds $I_{target}$ (step 220) before proceeding to step 222.

At step 222 a toggle of switches is triggered, such that the starting side's flagged switches are opened and the ending side's flagged switches are closed, causing the inductor to provide current to the ending side of the converter.

The LC "tank" circuit created by connecting the inductor in parallel with a capacitor on either the starting or ending sides results in a voltage waveform of the inductor and capacitor that has a sinusoidal pattern and a resonant frequency of approximately $$f_{resonant} = \frac{1}{2\pi\sqrt{LC_{end}}},$$

wherein $C_{end}$ is the capacitance of the ending side capacitor. The sinusoidal nature of the voltage change of the capacitor in the tank circuit provides that as the voltage of the capacitor increases, the current in the inductor decreases until zero current is reached. At that time, the voltage of the capacitor reaches a maximum, which is defined by the peak that appears at 90 degrees into the sinusoid.

The current cutoff threshold ($I_T$) is the level of current at which the controller opens all switches (as shown in step 226), preventing the inductor from continuing to discharge current or to be charged by the ending side capacitor to which it is connected. In a preferable embodiment, the current cutoff threshold is approximately zero, as mentioned previously. In this case, the switches are opened (step 226) when the current reading from the inductor reaches or crosses zero, as determined in steps 223 and 224. Because the voltage across the end side capacitor is at a maximum when the inductor's current is at zero due to the sinusoidal characteristics of the tank circuit formed, embodiments with current cutoff threshold at zero conveniently ensure that the inductor does not have any excess energy stored at the end of the conversion process.

A nonzero current cutoff threshold may be used (e.g., 500 mA), and such embodiments may advantageously provide a shorter than 90-degree transition time to change the voltage of the regulated port's capacitor from its starting voltage to the target voltage (when the target voltage has greater magnitude than the starting voltage) since there is no need to wait for the inductor to complete a full 90-degree discharge and to have its current return to the threshold value of zero. However, in this embodiment the energy remaining in the inductor when all switches are opened at step 226 may need to be dispersed or absorbed using a mechanism such as a snubbing capacitor in parallel with the inductor to prevent the switches from experiencing a current overflow resulting in damage and/or entering an avalanche mode.

In step 230 the process ends, or may return to the start at step 200 to resume monitoring of the interrupt timer at step 202.

As mentioned previously in this document, sometimes the voltage at the regulated port must change polarity over a single conversion cycle to reach the target voltage value, and this is detected in step 216. In this situation, a different conversion cycle is employed, starting at step 232 on FIG. 2B. First, the controller determines whether the magnitude of the regulated voltage equals the magnitude of the target voltage value in step 234. If it does not, the inductor is precharged by closing either the continuous switches or the cross switches between the inductor and the unregulated port at step 236 before moving on. Otherwise, the controller continues to step 238.

In step 236, if the magnitude of $V_2$ is less than the magnitude of $V_{target}$, the inductor is precharged with current in the opposite direction of the current that will appear if the flagged switches are closed in step 238. If the magnitude of $V_2$ is greater than the magnitude of $V_{target}$, the inductor is precharged with current in the same direction as the current that will appear when the flagged switches are closed in step 238. The magnitude of the precharged current generated in step 236 is determined by first assuming that the conversion cycle will end or restart when the current in the inductor ($I_L$) has reached the current cutoff threshold ($I_T$) and then supplying enough current to the inductor to ensure that at the time when $I_L$ reaches $I_T$, the voltage on the regulated port is equal to the target voltage. The effects of precharging the inductor will be discussed in further detail in connection with FIG. 2C below.

In step 238, the controller closes the switches flagged in step 213 or 214 on the side of the converter having the regulated port and current begins flowing through the inductor. The controller measures this current and the voltage on the regulated port ($V_2$) starting at step 240 until the instantaneous inductor current ($I_L$) reaches or crosses the current cutoff threshold ($I_T$) in step 242 and the regulated port's voltage has crossed zero since the beginning of the present cycle (e.g., since step 200 was last executed). At that time, the flagged switches are opened in step 244 and the process ends or restarts (e.g., by going to step 200) at step 246.

A target current (e.g., $I_{target}$) is not calculated between steps 232 and 246 because the inductor is connected to the regulated port and the resulting LC tank circuit is allowed to "ring" through approximately 180 degrees of oscillation as it crosses polarity. Therefore the controller only needs to monitor the current to wait for the end of the oscillation when the regulated port's voltage should be equal to the target voltage and the current through the inductor reaches the current cutoff threshold, which is typically zero, and because the inductor current may reach the current cutoff threshold before the target voltage is reached due to precharging conditions, the regulated port's voltage must also cross zero before the inductor is disconnected from the regulated port.

Figure 2C:
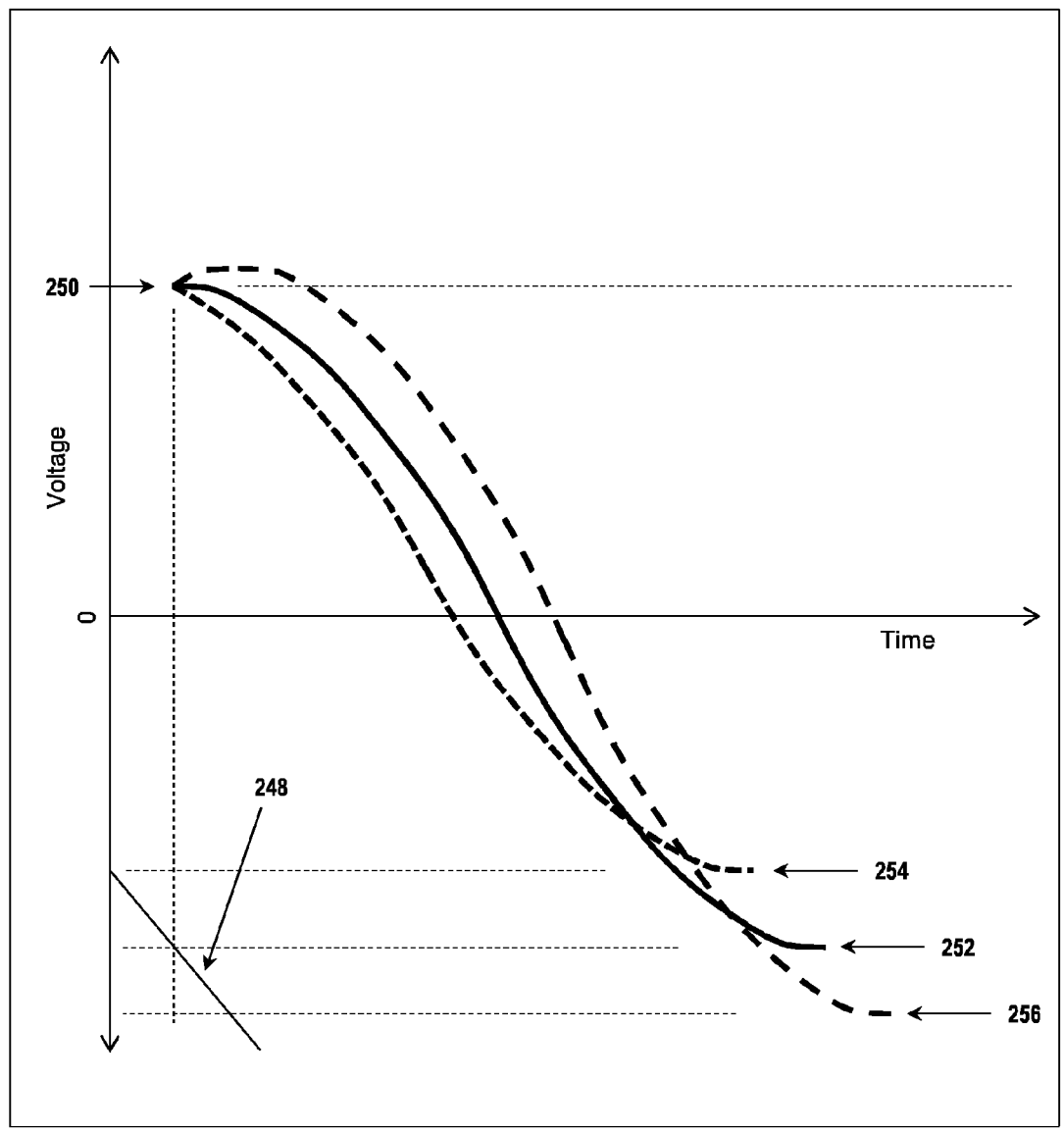
FIG. 2C is a diagram of the voltage over time of a regulated port of three embodiments of the invention wherein the regulated port's voltage undergoes a polarity change to reach a target value.

FIG. 2C illustrates an example of how the execution of steps 232 through 246 may affect the voltage of the regulated port. Thin line 248 represents the target voltage over time that the regulated port is being controlled to follow (e.g., a control signal). The current cutoff threshold is assumed to be zero in this illustration. Point 250 is an exemplary starting point where the voltage of the regulated port is positive. Point 252 corresponds with line 248 in showing a target voltage point that has equal magnitude to the voltage of the regulated port at 250. Thus, to reach target value 252, the inductor does not need to be precharged and the converter is permitted to oscillate through 180 degrees sinusoidally to reach point 252, at which time the current in the inductor has reached zero, evidenced by the zero slope of point 252. In this conversion cycle, the regulated port's voltage goes through a nearly perfect sign reversal, with the ending magnitude being almost the same as the starting magnitude (less losses). This symmetry can be adjusted by charging the inductor slightly before reaching point 250, as shown in connection with points 254 and 256.

Point 254 is a target voltage that has a lesser magnitude than the voltage of the regulated port at 250. To reach target value 254, the inductor is precharged with current in the same direction as the current flow that would appear if the regulated port was connected to the inductor at point 250, as shown by the steeper initial downward slope of the dashed line traveling from point 250 to 254 when compared to the line traveling from point 250 to 252. Here, the precharged current is calculated to allow the inductor to reach zero current at point 254, where the target voltage and the regulated port's voltage meet, as shown by the zero slope of the dashed line at point 254.

Point 256 is a target value having a greater magnitude than the regulated port's voltage at point 250. To reach target value 256, the inductor is precharged with current in the opposite direction from the current flow that would appear if the regulated port was connected to the inductor at point 250, as shown by the initial upward slope of the dashed line traveling from point 250 to 256 when compared to the line traveling from point 250 to 252. The precharged current for this scenario is calculated to allow the inductor to reach zero current at point 256, where the target voltage and the regulated port's voltage meet, as shown by the zero slope of the dashed line at point 256. Note that if the current cutoff threshold ($I_T$) is zero, the instantaneous current ($I_L$) reaches $I_T$ before the regulated port's voltage meets the target voltage in this case. For this reason, step 242 requires that the regulated port's voltage has crossed zero since the beginning of these cycles before the flagged switches are permitted to open in step 244. Otherwise the flagged switches could open at the positive peak voltage of the line traveling from point 250 to 256 instead of at the time that the regulated voltage reaches point 256.

Figure 3:
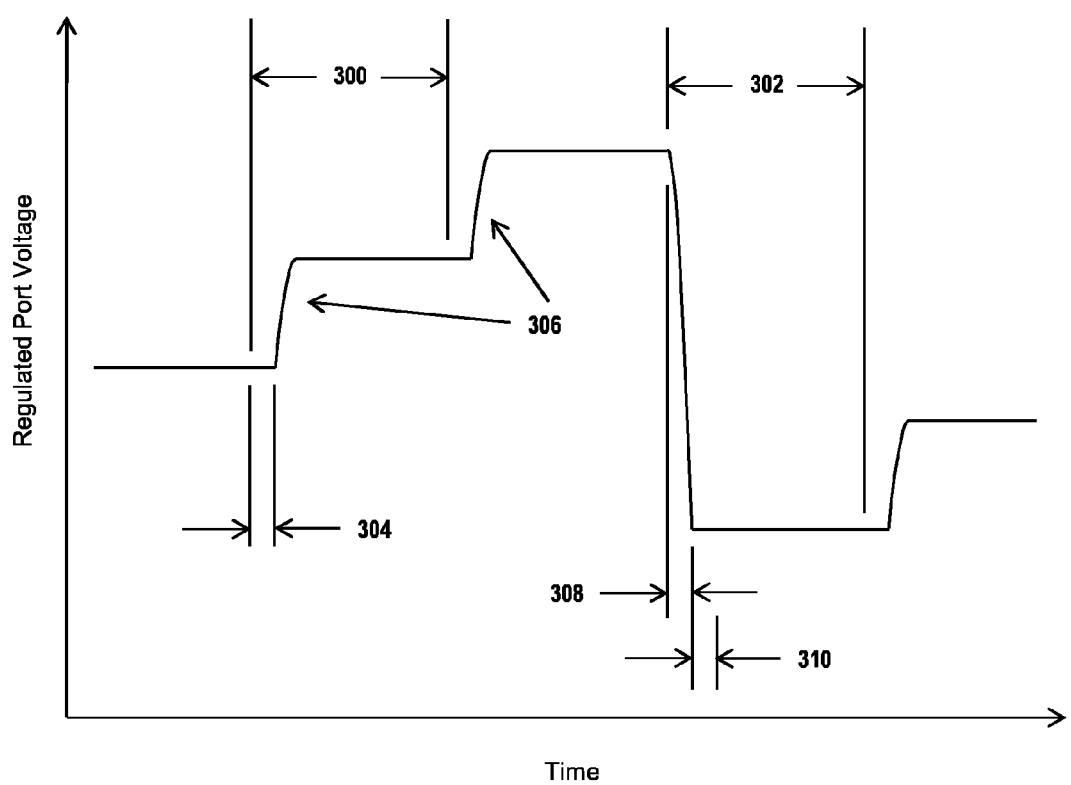
FIG. 3 is a diagram showing an example regulated port voltage over several conversion cycles of a converter according to an embodiment of the invention that has a regulated port that is not under a load.

An example of a regulated port voltage waveform resulting from the execution of the process of FIG. 2A can be seen in FIG. 3. The voltage of the regulated port is plotted in the time domain, showing several complete time periods (e.g., 300 and 302). Each time period starts when the interrupt timer is triggered (e.g., in step 202), and soon afterward the inductor begins charging from the converter's starting side's capacitor (e.g., in step 220). An example of this charging time is represented as period 304. Once the inductor has reached the proper energy level, the inductor is discharged to the ending side of the converter. The voltage of the regulated port changes according to a sinusoidal output curve (e.g., 306) with a transition duration time determined by the resonant frequency of the converter. On close inspection of this graph, it can be inferred that the current cutoff threshold setting in this converter is approximately zero, since the sinusoidal transition periods 306 follow approximately 90-degrees of the sinusoidal curve of the LC tank circuit created by the inductor and end-side capacitor of the converter, which point corresponds to zero current in the inductor. Other current cutoff thresholds would not produce a regulated port voltage that has zero slope at the end of a transition period 306. Additionally, it can be inferred that there is no load on the regulated port of this converter because after the transition period 306 ends, there is no drift or sag in voltage over the rest of the time period 300. Instead, the voltage remains constant during that waiting period. This figure also illustrates that the converter may increase or decrease the voltage of the regulated port. In time period 302, the regulated port's voltage needs to be decreased, so instead of charging the inductor from the unregulated port at first (as was done during period 304 in time period 300), the inductor is charged by the regulated port over period 308 and is cut off at the end of period 308 when the inductor has reached the target current (e.g., $I_{target}$). Also, note that at the start of period 308, the slope of the port's voltage is zero, since the inductor was completely discharged at the start of period 308. Afterward, during period 310, the inductor is discharged to the unregulated side of the converter, which does not affect the regulated port's voltage shown in this figure. In some embodiments the converter is set to update over time periods (e.g., 300 and 302) that are as short as the length of the inductor charging time 308 plus the length of the discharging time 310, but this embodiment has built-in waiting periods that delay the updating cycle between the end of a discharging period 306 or 310 and the start of a new time period 300 or 302. Waiting periods may be advantageous to implement as they can reduce the strain on the system.

Figure 4:
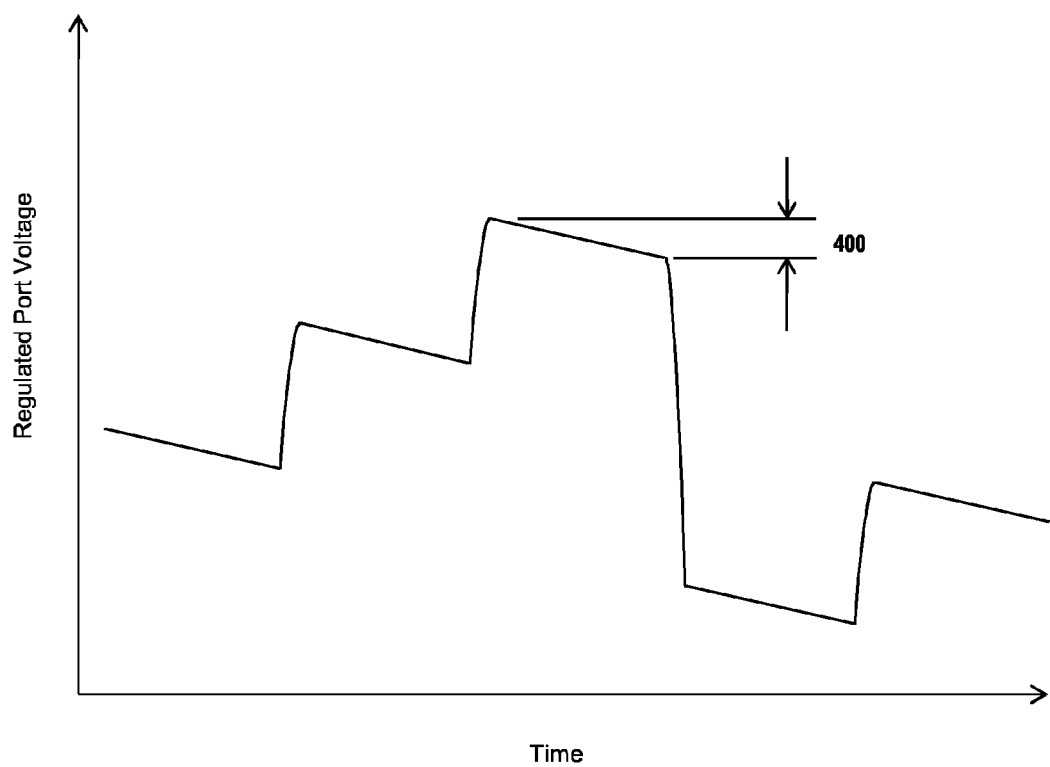
FIG. 4 is a diagram showing an example regulated port voltage over several conversion cycles of a converter according to an embodiment of the invention that has a regulated port that is under a load.

FIG. 4 is a graph showing the regulated port voltage of a converter over time according to an embodiment of the invention. In this case, a voltage drift 400 is visible due to the regulated port being under a load that gradually depletes the energy stored in the regulated port's capacitor. The voltage of the regulated port in this embodiment drifts downward between updates in the conversion process, and this drift must be accounted for in the next conversion process, resulting in larger voltage swings during inductor discharge periods (if the drift is toward zero and the voltage is being updated to a higher magnitude) or smaller voltage swings (if the drift is toward zero and the voltage is being updated to a lower magnitude). In some of these embodiments the drift results in different lengths of inductor charging periods from cycle to cycle.

Figure 5:
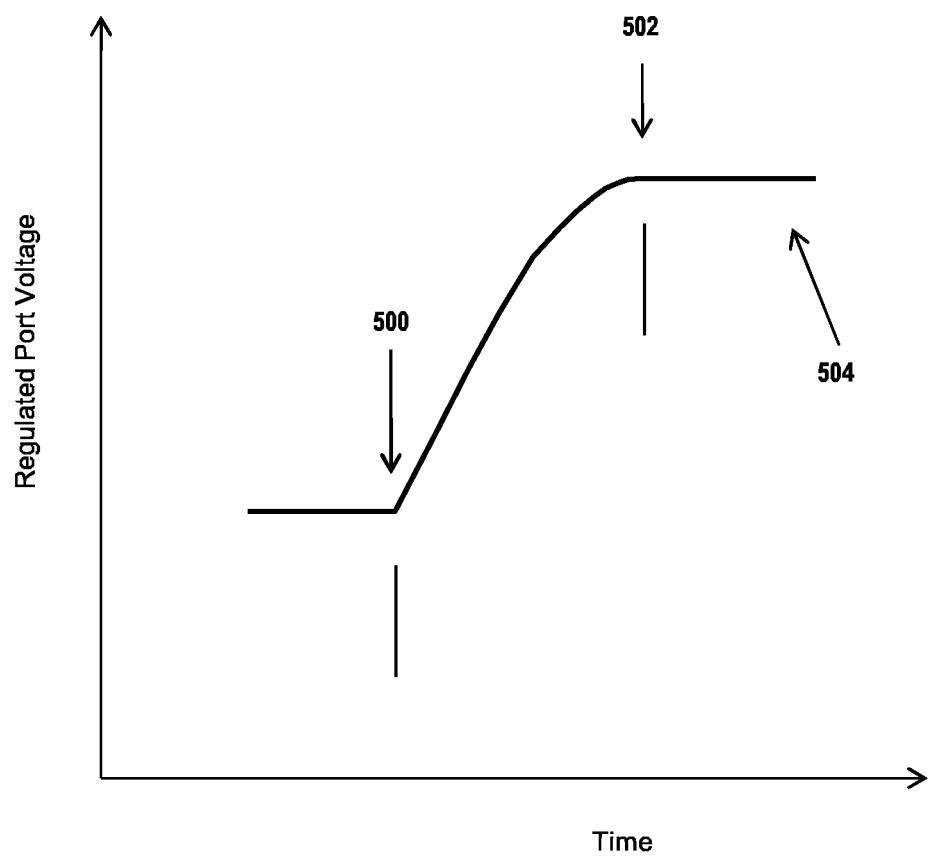
FIG. 5 is a diagram showing a detailed view of an example regulated port voltage over time from a converter according to an embodiment of the invention that has a regulated port that is not under a load.
Figure 6:
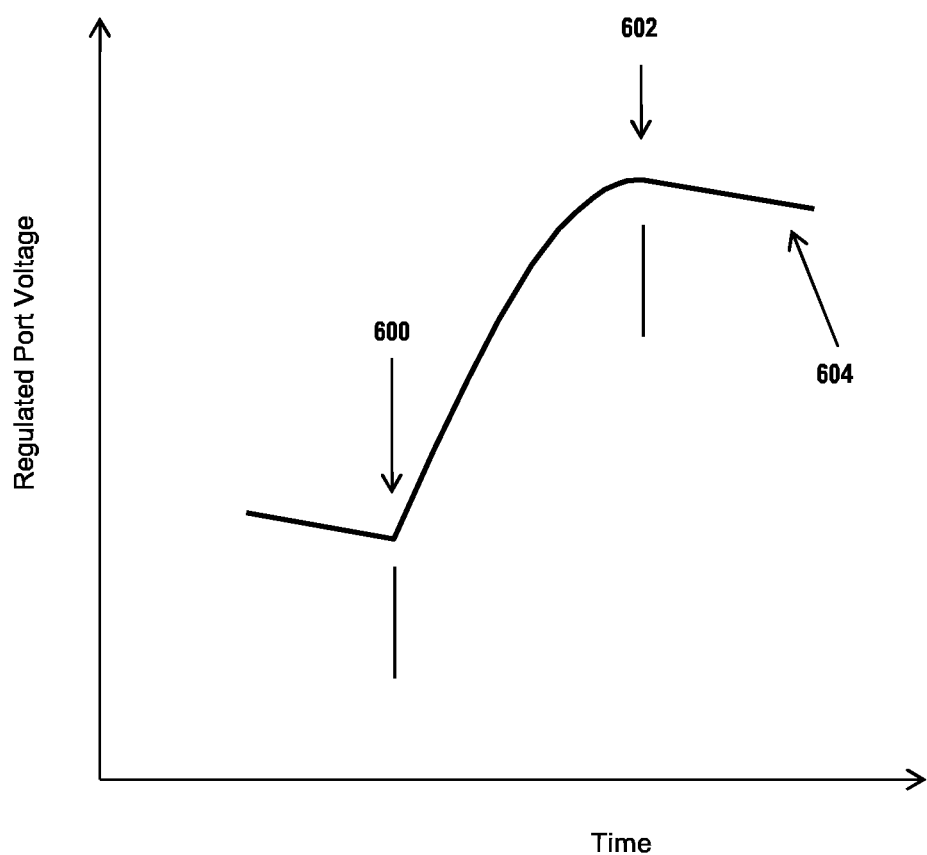
FIG. 6 is a diagram showing a detailed view of an example regulated port voltage over time from a converter according to an embodiment of the invention that has a regulated port that is under a load.

FIG. 5 shows a detailed view of an example regulated port voltage waveform of FIG. 3, showing the point at which the inductor is fully charged 500, the sinusoidal inductor discharge period between 500 and 502, and the return to an inactive waiting/monitoring state from point 502 to point 504 and beyond. FIG. 6 shows a detailed view of the example regulated port's voltage waveform of FIG. 4, showing the point at which the inductor is fully charged 600, the sinusoidal inductor discharge period between 600 and 602, and the return to an inactive waiting/monitoring state from point 602 to point 604 and beyond. The voltage increase between points 500 and 502 is smaller than the change between points 600 and 602 due to the voltage drift present due to the load on the embodiment of FIG. 6.

Embodiments herein disclosed stand as improvements over existing power converters by allowing efficient symmetric and asymmetric conversion from the same single stage topology, and without preference to a specific input/output magnitude or polarity, eliminating the need for alternative or additional converters. Furthermore, embodiments of the invention successfully eliminate the losses and expense of using diodes, although MOSFETs or other switches typically take their place which can be more expensive per watt. Expandability through multiple branches and ports may be achieved with certain embodiments described more completely hereinafter. This increases the cost efficiency of not only building the converter but using it as well. The number and complexity of the components of the converter is likewise reduced or eliminated when compared to other power converters.

Figure 7:
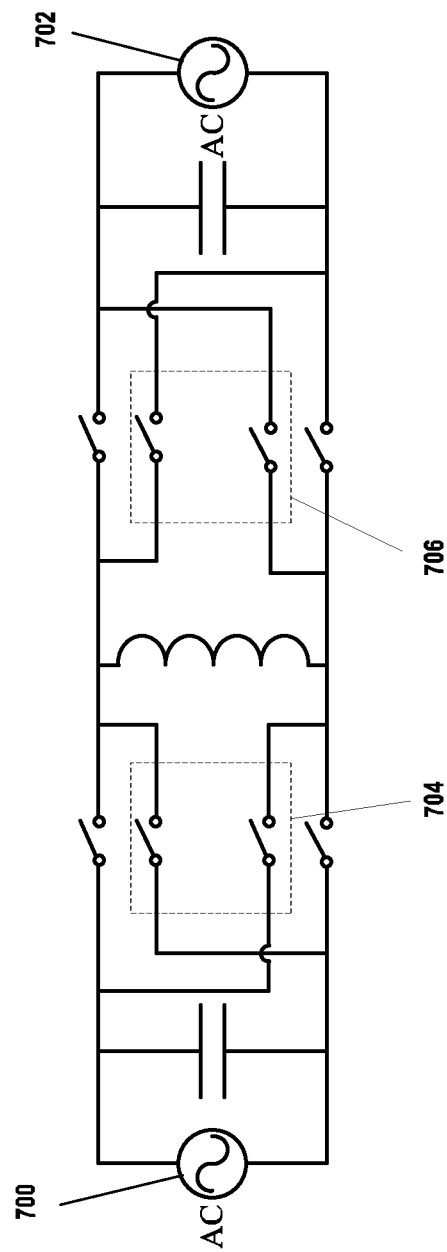
FIG. 7 is a diagram of an exemplary single-stage power conversion circuit which is capable of bidirectional and symmetrical power conversion between AC input and output ports.

Another embodiment is shown in FIG. 7 wherein an exemplary circuit which is capable of bidirectional and symmetrical power conversion between two AC ports is shown. The first port 700 and second port 702 use AC signals. Only one of the pairs of cross-switches 704 and 706 is necessary for bidirectional conversion between these two ports.

Figure 8:
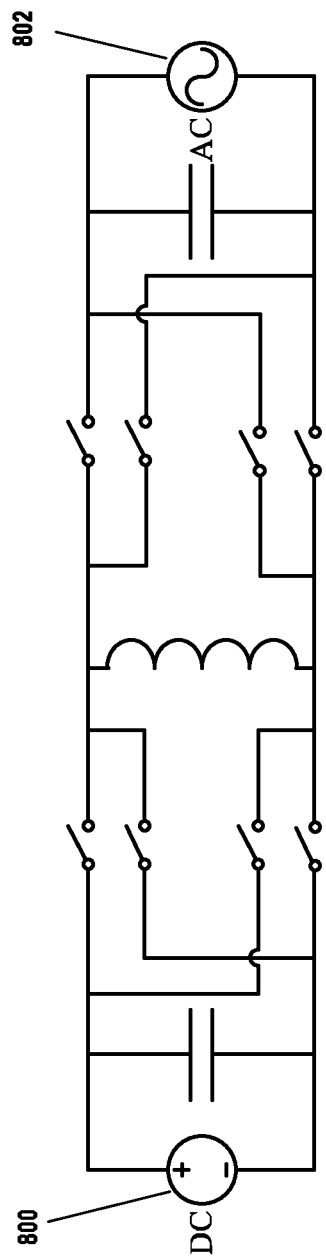
FIG. 8 is a diagram of an exemplary single-stage power conversion circuit which is capable of bidirectional power conversion between DC and AC input and output ports.
Figure 9:
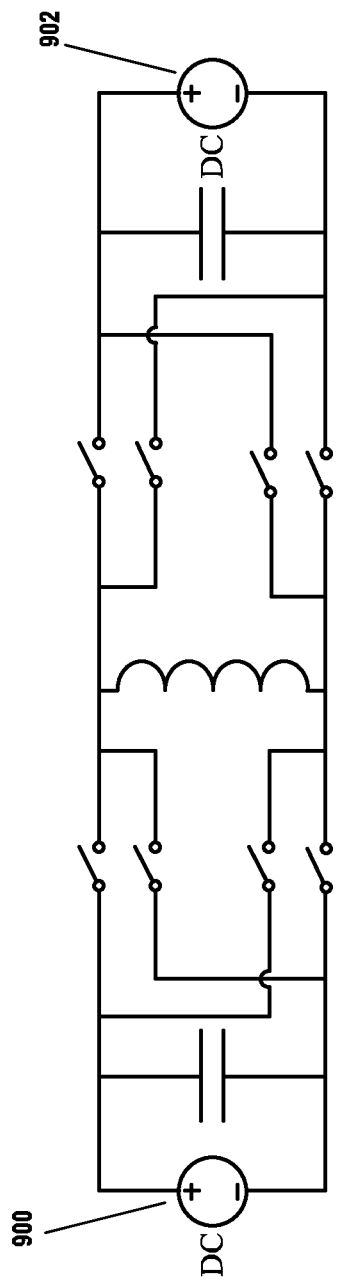
FIG. 9 is a diagram of an exemplary single-stage power conversion circuit which is capable of bidirectional and symmetrical power conversion between DC input and output ports.

Another embodiment is shown in FIG. 8 with an asymmetrical converter featuring a DC port 800 and an AC port 802. FIG. 9 is an exemplary DC-DC symmetrical converter arrangement with two DC ports (900 and 902). The converters of FIGS. 8 and 9 have redundant cross switches similar to switches 704 and 706 mentioned in connection with FIG. 7.

Figure 10:
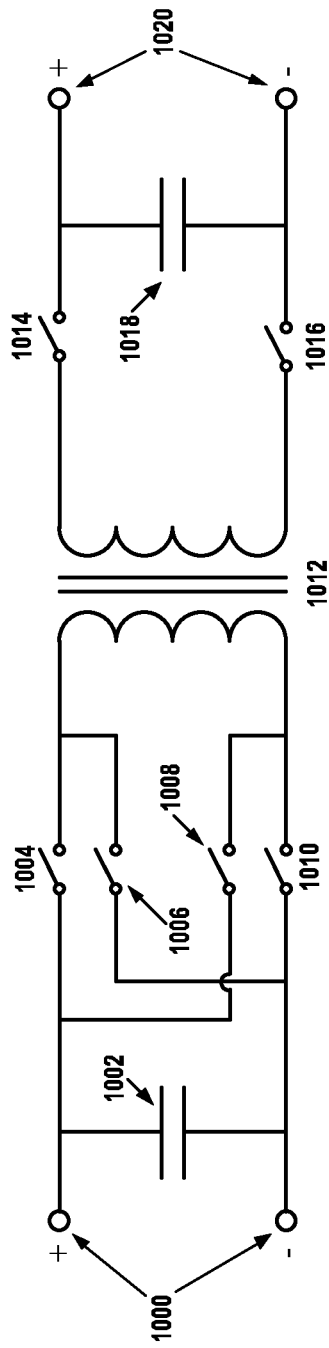
FIG. 10 is a diagram of another exemplary single-stage power conversion circuit which is capable of bidirectional and symmetrical power conversion.

FIG. 10 shows an optimized two-port converter having a first port 1000 in parallel with a first capacitor 1002, continuous switches, 1004 and 1010, and cross-switches, 1006 and 1008, an inductor having a magnetic core 1012, an additional pair of continuous switches 1014 and 1016, a second capacitor 1018, and a second port 1020. A second set of cross switches is not required for universal conversion in the embodiment of FIG. 1, so the embodiment of FIG. 10 shows an optimization of FIG. 1 that reduces the number of cross switches. The removal of the second set of cross switches may impact the ability of the circuit of FIG. 10 to utilize more than two ports, however, as will be discussed in connection with FIGS. 11-13.

The inductor 1012 of FIG. 10 is shown as a pair of windings sharing a magnetic core. This shows that a multi-coil inductor or transformer may be advantageous in some embodiments, and that the converter may still be considered single stage despite the presence of multiple coils as long as the coils draw from the same energy storing shuttling means, which in this embodiment is the magnetic field in the transformer core. The use of an isolation transformer or other comparable transformer as the inductor 1012 also permits galvanic isolation or the use of a turns ratio. For example, the isolation transformer embodiment of the inductor 1012 may be used in place of the simple inductor 112 of FIG. 1 and other embodiments where a simple inductor is shown.

Exemplary Multi-Port Converters

Figure 11:
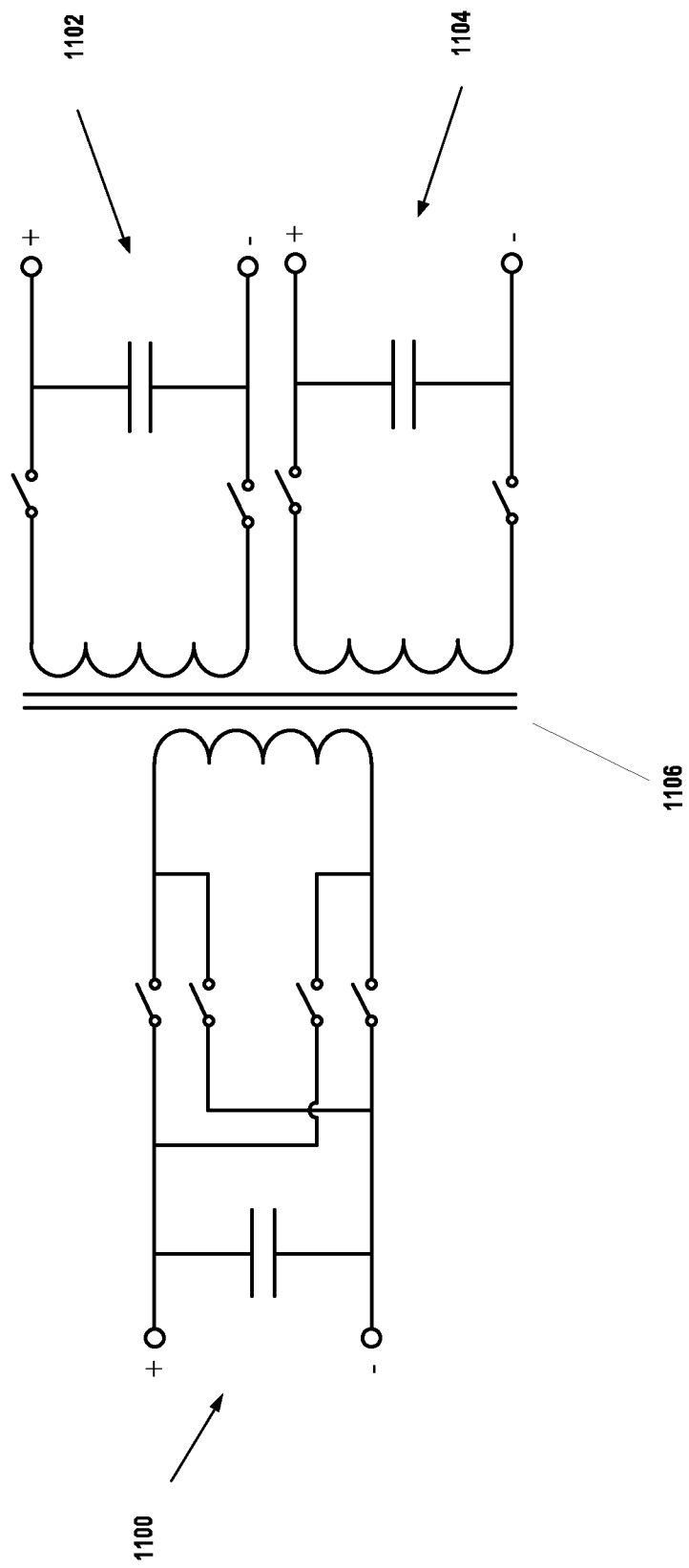
FIG. 11 is a diagram of another exemplary power conversion circuit having more than two ports wherein the number of switches has been minimized.

FIG. 11 is a diagram of another exemplary circuit embodiment which illustrates a universal single stage converter with more than two ports wherein the number of switches has been minimized. Here, a first branch 1100, second branch, 1102, and third branch 1104 share a common magnetic field-bearing core 1106, so the current stored by the coil in any branch may be discharged into any branch. This means any combination of the branches may be used in a given conversion. However, because the first branch 1100 is the only branch in this embodiment with cross switching capability, only the first branch 1100 may be combined with the second branch 1102 or third branch 1104 for universal, bidirectional conversion. DC-DC conversion remains possible between the second branch 1102 and third branch 1104, but asymmetric or AC-AC conversion between these two is not possible with the first branch 1100 disconnected.

Figure 12:
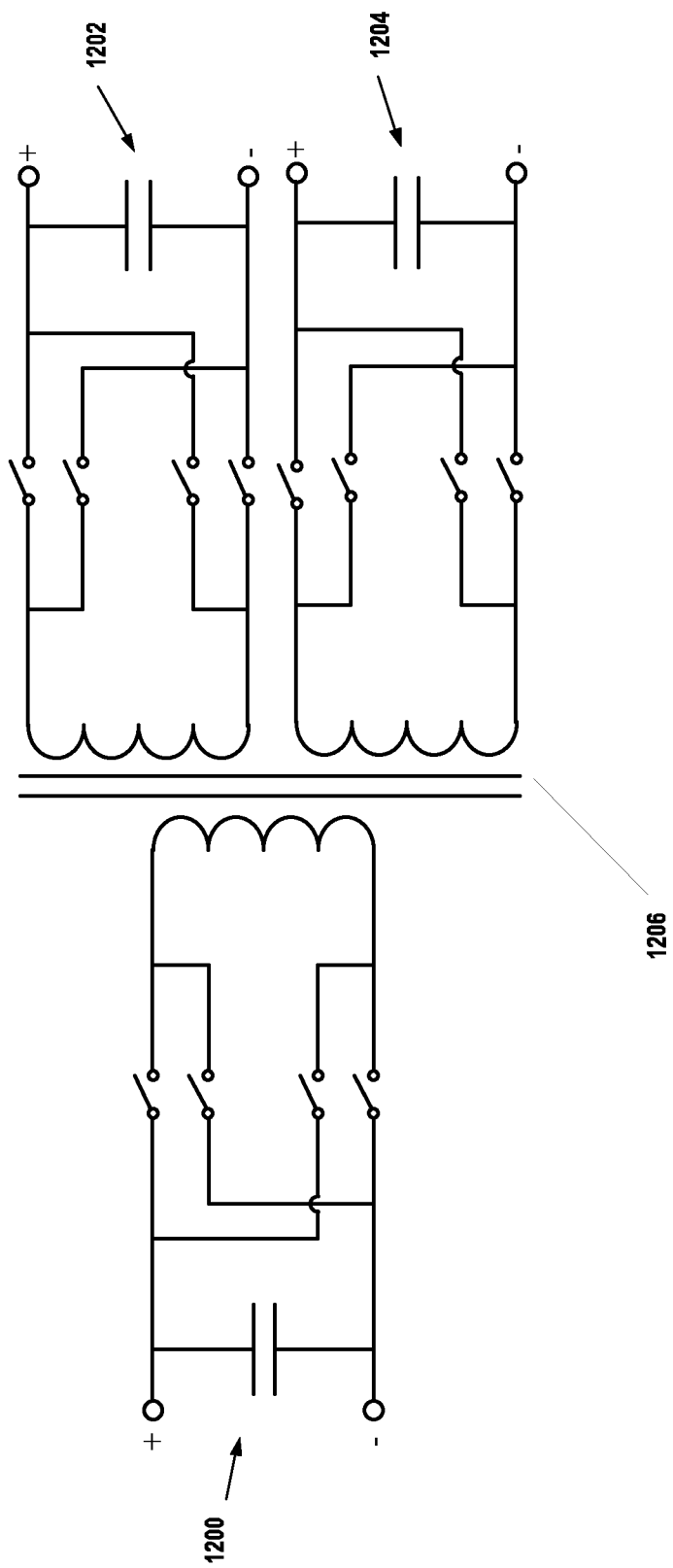
FIG. 12 is a diagram of another exemplary power conversion circuit having more than two ports wherein there is universality of conversion between all ports.

FIG. 12 expands the capability of the multi-branch converter of FIG. 11, with a first branch 1200, second branch 1202, and third branch 1204 that all have cross switching capability. Again, all three branches share a common magnetic core 1206, so energy stored by the inductor portions of each branch may be transferred to either other branch. There is cross switching at each branch in this embodiment and the converter is capable of universal conversion between any two of the three branches shown. Here, all of the branch pairs have a redundant set of cross switches.

Figure 13:
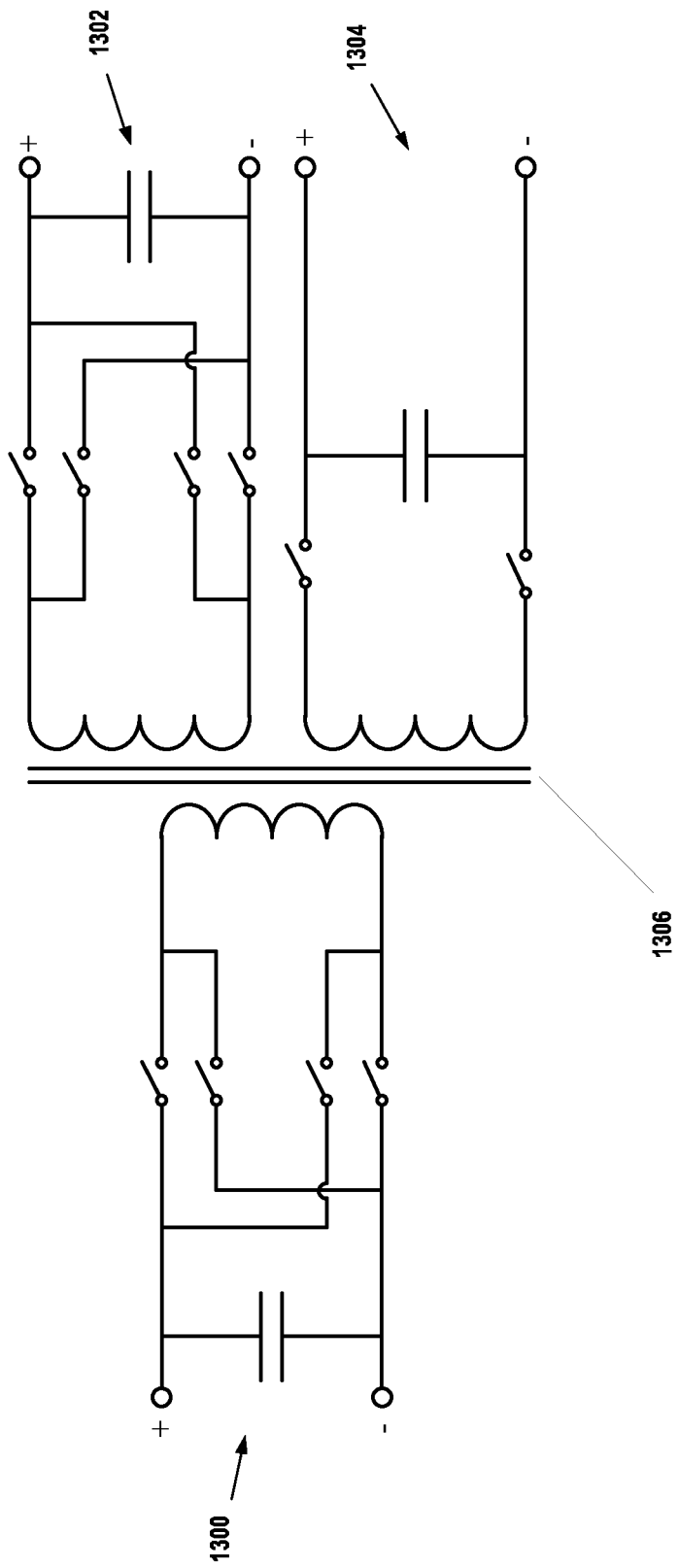
FIG. 13 is a diagram of another exemplary power conversion circuit having more than two ports wherein there is universality of conversion between all ports with a minimal number of switches.

FIG. 13 is an optimized version of the circuit of FIG. 12 that allows universal conversion between a first branch 1300, second branch 1302, and third branch 1304 which share a common magnetic inductor core 1306, wherein the total number of cross switches in the circuit has been minimized. This embodiment allows the circuit to be set up for conversion from the first branch 1300 to the second branch 1302 with a redundant pair of cross switches, but no redundant pair of cross switches when the first or second branches, 1300 or 1302, are connected to the third branch 1304. As a result, universal conversion between any of the branches is available with this embodiment yet only one of the branch pairs has a redundant set of cross switches.

The multi-branch embodiments of FIGS. 11, 12, and 13 are representative of additional embodiments capable of expanding the number of ports connected to the same inductor or magnetic core, and are not intended to limit embodiments of the invention to any particular number of possible ports. While in these figures various embodiments are presented having two or three ports, converters with a greater number of ports are also intended to be considered within the scope of the invention. For example, converter embodiments having four, five, ten, fifty, or any other larger number of branches which share a common inductor in the manner that the branches of FIGS. 11, 12, and 13 share a common inductor core or other inductive storage medium would all be considered to be within the scope of the invention. For AC conversion, these multiple-port converters may have full cross switching on all branches, such as the embodiment shown in FIG. 12, and they may have cross switching in only a portion of the branches, such as the embodiments shown in FIGS. 11 and 13. In order to retain universal conversion capability between all ports in the converters, there must either be full cross switching, e.g. the converter from FIG. 12, or cross switching in all branches except for one, e.g. the converter from FIG. 13.

The converter embodiments described herein which have three or more branches may be advantageous when the size of the capacitor of one of the branches is an important factor, such as when the capacitor of that branch has a higher or lower rated lifetime than other capacitors in the converter system. Additionally, multi-branch embodiments may permit conversion options that are optimized around selecting the pair of branches according to the size of the capacitors or the ability of the switches on each side of the inductor. For example, the converter may have a high voltage conversion setting wherein a pair of branches is chosen that includes highly rated capacitors and switches and lower rated capacitor and switch branches may be used for lower voltage conversions in order to use the capacitors at voltages to which they are most ideally suited. The presence of multiple ports that can all interchangeably be regulated by receiving energy from multiple other ports allows the converter to be used as a sort of energy switchboard, where each branch may be connected to another branch through the same inductor and without necessarily any moving parts (if the switches selected have that capability). Converters having three or more branches also provide the ability to simultaneously convert a signal from an input branch to multiple regulated branches, or vice versa, as long as the capacitors on all of the regulated branches have the same voltage. Furthermore, this topology inherently confers parallelability among any of its ports. In some embodiments this parallelability includes connecting two or more branches, regulated or not, to the inductor simultaneously. Preferably, branches that are paralleled have capacitive elements that have matching capacitance and voltages to prevent imbalanced charging or discharging of the capacitors in one or more of the paralleled branches. The paralleled branches also preferably have equivalent switching elements (e.g., both have a continuous switching set and cross-switching set, or both have only a continuous-switching set) in order to allow the capacitors to be charged and discharged in the same way.

Methods and algorithms of the present invention may be embodied on a computer readable medium or computer storage medium having embodied thereon computer-useable instructions that, when executed, implement a system. The term "computer-readable medium" as used herein includes not only a single physical medium or single type of medium, but also a combination of one or more physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). For example, in the present invention a computer-readable medium (such as memory) may be included to store instructions for a controller to operate the power converter.

In some embodiments the power converters disclosed herein may be integrated with or connected to power management systems, such as those used for peak mitigation, load leveling, or backup or uninterruptible power supplies, since those systems may be greatly benefited by a single stage bidirectional conversion device to transfer energy between energy storage devices and a distribution grid or other energy source. Power converters may additionally comprise controllers for directing the operation of the power converters, signal conditioning electronics such as stabilizing capacitors, cables, connectors, and other items required to efficiently and safely transfer the stored energy between an energy storage device and the utility distribution grid.

Miscellaneous Information

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or component of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A single-stage power converter, comprising:
   a. an inductor;
   b. a first side of the converter comprising:
      i. a first capacitor connected in parallel to the inductor,
      ii. a first port connected in parallel to the first capacitor, and
      iii. a plurality of first switching elements having a selectable open state and closed state, the first switching elements linking the first capacitor and the inductor in such a manner that when the first switching elements are closed, a first conductive loop is formed by the first capacitor and the inductor;
   c. a second side of the converter comprising:
      i. a second capacitor connected in parallel to the inductor,
      ii. a second port connected in parallel to the second capacitor, and
      iii. a plurality of second switching elements having a selectable open state and closed state, the second switching elements linking the second capacitor and the inductor in such a manner that when the second switching elements are closed, a second conductive loop is formed by the second capacitor and the inductor; and
   d. a system controller able to control the state of the first switching elements and the second switching elements; wherein the first conductive loop is formed without including another capacitor in the loop and the second conductive loop is formed without including another capacitor in the loop.

2. The single-stage power converter of claim 1, wherein at least two of the first switching elements are a continuous switching set and at least two of the second switching elements are a continuous-switching set.

3. The single-stage power converter of claim 2, wherein the controller only allows one set of said switching elements to be closed at once.

4. The single-stage power converter of claim 2, wherein at least two switching elements of either the first switching elements or the second switching elements are a cross-switching set.

5. The single-stage power converter of claim 4, wherein the controller only allows one set of said switching elements to be closed at once.

6. The single-stage power converter of claim 1, wherein the controller executes instructions comprising:
   a. opening the first switching elements when at least one of the second switching elements is closed, and
   b. opening the second switching elements when at least one of the first switching elements is closed.

7. The single-stage power converter of claim 1, further comprising a non-transitory computer-readable medium having instructions embedded thereon, the instructions being executable by the controller, the instructions comprising:
   a. opening the first switching elements when at least one of the second switching elements is closed, and
   b. opening the second switching elements when at least one of the first switching elements is closed.

8. The single-stage power converter of claim 7, wherein one of the ports is a regulated port, the instructions further comprising:
   a. sending a "close" command to the first switching elements to charge the inductor from the first capacitor until an initial energy level is stored in the inductor, the initial energy level being equal to the change in energy between a present voltage of the regulated port and a target voltage,
   b. sending a "close" command to the switching elements linking the regulated port to the inductor, and
   c. opening the first switching elements and the second switching elements when the current in the inductor reaches a current cutoff threshold.

9. The single-stage power converter of claim 7, wherein at least two of the first switching elements and at least two of the second switching elements are continuous-switching sets, and
   at least two switching elements of either the first switching elements or the second switching elements are a cross-switching set.

10. The single-stage power converter of claim 1, wherein the inductor has multiple coils.

11. The single-stage power converter of claim 1, further comprising an interrupt timer imposing a waiting period between conversion cycles performed by the converter.

12. A single-stage power converter, comprising:
   a. an inductor;
   b. one or more regulated branches of the converter, each regulated branch having:
      i. a regulated-branch capacitor connected in parallel to the inductor,
      ii. a regulated-branch port connected in parallel to the regulated-branch capacitor, and
      iii. at least two regulated-branch switching elements having a selectable open state and closed state, the regulated-branch switching elements linking the regulated-branch capacitor and the inductor in such a manner that when the regulated-branch switching elements are closed, a regulated conductive loop is formed by the regulated-branch capacitor and the inductor;
   c. one or more unregulated branches of the converter, each unregulated branch having:
      i. an unregulated-branch capacitor connected in parallel to the inductor,
      ii. an unregulated-branch port connected in parallel to the unregulated-branch capacitor, and
      iii. at least two unregulated-branch switching elements having a selectable open state and closed state, the unregulated-branch switching elements linking the unregulated-branch capacitor and the inductor in such a manner that when the unregulated-branch switching elements are closed, an unregulated conductive loop is formed by the unregulated-branch capacitor and the inductor; and
   d. a system controller able to control the state of all of the switching elements of said branches
      wherein the one or more regulated conductive loops are formed without including another capacitor in each loop, and the one or more unregulated conductive loops are formed without including another capacitor in each loop.

13. The single-stage power converter of claim 12, wherein at least two switching elements in each of said branches form a continuous-switching set.

14. The single-stage power converter of claim 13, wherein at least two of the switching elements in one of said branches form a cross-switching set.

15. The single-stage power converter of claim 14, wherein all but one of said branches has at least two switching elements forming a cross-switching set.

16. The single-stage power converter of claim 12, wherein two or more said branches are paralleled branches, and said paralleled branches are either all regulated branches or all unregulated branches.

17. The single-stage power converter of claim 16, wherein the capacitor of the paralleled branches have equal voltage.

18. The single-stage power converter of claim 12, wherein the capacitor of each branch has a capacitance, and the capacitance of the capacitor of a branch being regulated differs from the capacitance of the capacitor of an unregulated branch.

19. The single-stage power converter of claim 12, wherein each individual capacitor of each branch has a voltage rating, and the voltage rating of the capacitor of a branch being regulated differs from the voltage rating of the capacitor of an unregulated branch.

20. The single-stage power converter of claim 12, wherein the inductor has multiple coils.

21. The single-stage power converter of claim 12, further comprising an interrupt timer imposing a waiting period between conversion cycles performed by the converter.

22. A single-stage power converter capable of bidirectional symmetric and asymmetric conversion, comprising:
   a. an inductor;
   b. a first side of the converter, comprising:
      i. a first capacitor connected in parallel to the inductor, the first capacitor having a first terminal and a second terminal, the first terminal and second terminal forming a first port, and
      ii. two continuous switches having a selectable open state and closed state, the continuous switches linking the first capacitor and the inductor in such a manner that when the continuous switches are closed, a conductive loop is formed by the first capacitor and the inductor that induces a positive rate of change of current through the inductor when the first terminal has a positive charge and the second terminal has a negative charge;
   c. a second side of the converter, comprising:
      i. a second capacitor connected in parallel to the inductor, the second capacitor having a third terminal and a fourth terminal, the third terminal and fourth terminal forming a second port, and
      ii. two continuous switches linking the second capacitor and the inductor in such a manner that when the continuous switches are closed, a conductive loop is formed by the second capacitor and the inductor that induces a positive rate of change of current through the inductor when the third terminal has a positive charge and the fourth terminal has a negative charge, and
      iii. two cross switches linking the second capacitor and the inductor in such a manner that when the cross switches are closed, a conductive loop is formed by the second capacitor and the inductor that induces a negative rate of change of current through the inductor when the third terminal has a positive charge and the fourth terminal has a negative charge; and
      iv. a system controller able to control the state of the cross switches and the continuous switches of the first and second sides.

* * * * *